(12) United States Patent
Wainner et al.

(10) Patent No.: US 10,735,472 B2
(45) Date of Patent: Aug. 4, 2020

(54) CONTAINER AUTHORIZATION POLICIES FOR NETWORK TRUST

(71) Applicant: Cisco Technology, Inc., San Jose, CA (US)

(72) Inventors: Scott Wainner, Sterling, VA (US); Bruce Martins, Aurora (CA); Christopher Holmes, Toronto (CA)

(73) Assignee: Cisco Technology, Inc., San Jose, CA (US)

(*) Notice: Subject to any disclaimer, the term of this patent is extended or adjusted under 35 U.S.C. 154(b) by 205 days.

(21) Appl. No.: 16/031,903

(22) Filed: Jul. 10, 2018

(65) Prior Publication Data

US 2020/0021615 A1    Jan. 16, 2020

(51) Int. Cl.
| | |
|---|---|
| *H04L 29/06* | (2006.01) |
| *G06F 21/53* | (2013.01) |
| *G06F 8/60* | (2018.01) |
| *G06F 8/71* | (2018.01) |
| *H04L 9/32* | (2006.01) |
| *G06F 9/455* | (2018.01) |
| *H04L 9/08* | (2006.01) |
| *H04L 29/08* | (2006.01) |

(52) U.S. Cl.
CPC .............. *H04L 63/20* (2013.01); *G06F 8/60* (2013.01); *G06F 8/71* (2013.01); *G06F 9/45558* (2013.01); *G06F 21/53* (2013.01); *H04L 9/0861* (2013.01); *H04L 9/3228* (2013.01); *H04L 9/3268* (2013.01); *H04L 63/062* (2013.01); *G06F 2009/45562* (2013.01); *H04L 67/34* (2013.01)

(58) Field of Classification Search
CPC ..... H04L 63/20; H04L 9/3228; H04L 9/0861; H04L 63/062; H04L 9/3268; H04L 67/34; H04L 9/3247; H04L 63/00; G06F 9/45558; G06F 8/71; G06F 8/60; G06F 21/53; G06F 2009/45562
See application file for complete search history.

(56) References Cited

U.S. PATENT DOCUMENTS

| | | |
|---|---|---|
| 8,856,504 B2 | 10/2014 | Maino et al. |
| 8,909,928 B2 | 12/2014 | Ahmad et al. |

(Continued)

OTHER PUBLICATIONS

Arnold et al., "Building the IBM Containers cloud service", IBM Journal of Research and Development, vol. 60, Issue: 2-3, Mar.-May (Year: 2016).*

(Continued)

*Primary Examiner* — Morshed Mehedi
(74) *Attorney, Agent, or Firm* — Lee & Hayes, P.C.

(57) ABSTRACT

The container deployment system of the present disclosure provides systems and processes to perform authorization of each unique container instance by the enterprise organization that published the container image and requested the container instance. A controller may be programmed or configured to apply one or more authorization policies to determine if a container instance should be executed or not. The authorization policies may include rules that restrict the number of containers running, cost consideration for executing a container, violations of time constraints for the execution of a container image, and violations of location constraints for execution of a container image, among other variations.

20 Claims, 7 Drawing Sheets

(56) References Cited

U.S. PATENT DOCUMENTS

| | | | |
|---|---|---|---|
| 9,667,628 B2* | 5/2017 | Johnson | G06F 21/51 |
| 10,248,449 B1* | 4/2019 | Emelyanov | G06F 9/5077 |
| 2014/0348161 A1* | 11/2014 | Koponen | H04L 41/08 |
| | | | 370/389 |
| 2017/0149843 A1* | 5/2017 | Amulothu | G06F 9/45558 |
| 2017/0177860 A1* | 6/2017 | Suarez | G06F 21/31 |
| 2017/0222981 A1 | 8/2017 | Srivastav et al. | |
| 2017/0353309 A1* | 12/2017 | Gray | H04L 9/3236 |
| 2018/0359259 A1* | 12/2018 | Leon | H04L 63/102 |
| 2019/0347121 A1* | 11/2019 | Luo | G06F 8/63 |

OTHER PUBLICATIONS

Zhai et al., "Practical Third-Party Attestation for the Cloud", Workshop on Hot Topics in Cloud Computing, dated Jul. 2017, 14 pages.

* cited by examiner

CONTAINER AUTHORIZATION POLICIES FOR NETWORK TRUST

TECHNICAL FIELD

One technical field of the present disclosure is management of executable computer programs that are accessed from server computers by large numbers of client computers, using containerized execution. Another technical field is controlling execution of container images based on authorization policies.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer application programs executing in software containers are now widely used to deploy large-scale services for large numbers of client computers. In such a containerized services context, an enterprise may publish a container image for execution on an infrastructure provider's infrastructure, such as a cloud computing platform. A key problem in this context is permitting execution of applications only by authorized computers.

Existing security efforts in the containerized services have focused on protecting the underlying infrastructure such a host, storage, and network services. Most of these efforts focus on protecting the kernel, restricting namespaces and resources, minimizing the daemon attack surface, whitelisting container privileges, and providing hardening services to the system infrastructure. Likewise, additional security efforts have focused on trusting the container images, scanning the container libraries, and finally asserting managed secrets passed to the container. These broad-based privileges are user-based in the sense that they verify that a particular user has privileges to perform actions on the host infrastructure, or the underlying security of the internal content of the containers themselves.

However, there is no process in place for the authorization of any specific instance of a container image. This is a significant gap in a trust model in which an enterprise wants to trust any newly instantiated container. There is nothing inherently in the container that uniquely identifies the instance as trustworthy, except any parameters passed by the infrastructure provider's managed secrets. This is inherently untrusted, as the enterprise may not want to provide any secrets or credentials to the infrastructure provider.

Thus, what is need is system of validating, by an enterprise, newly created container instances without relying on the host infrastructure provider or the passage of managed secrets between the enterprise and the host infrastructure provider.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
3.0 EXAMPLE PROCESSES AND ALGORITHMS
   3.1 DIRECT CONTAINER RUN-TIME AUTHORIZATION
   3.2 PROXY CONTAINER RUN-TIME AUTHORIZATION
4.0 IMPLEMENTATION MECHANISMS—HARDWARE OVERVIEW
5.0 IMPLEMENTATION MECHANISMS—SOFTWARE OVERVIEW
6.0 OTHER ASPECTS OF DISCLOSURE 1.0 General Overview In an embodiment, a container deployment system uses a combination of trusted container code with embedded algorithms and temporal trust models. An enterprise will build a private image of their container that can be authorized using published methods for retrieving trusted images from repositories. The execution of the trusted image as a container is not dependent upon any capabilities provided by the host infrastructure provider or container execution environment and no managed secrets are shared with said environment.

Instantiation of the container on the host infrastructure in the container deployment system may include, in some embodiments: (a) untrusted host environment for container execution; (b) public key infrastructure (PKI) certificate authority (CA) with token generation capabilities; (c) a trusted registry or repository with a certificate obtained from the certificate authority and (d) a code authorization controller that also has a key from the certificate authority. These four functional elements provide the security framework that authorizes the execution of the container image in an untrusted environment.

In an embodiment, it is assumed that the trusted registry and the controller have previously authenticated themselves through the PKI infrastructure and certificates have been distributed. Thus, a trust model exists between the controller and the registry. The enterprise can then build their own private container image which includes a security algorithm for authorization. The controller uploads the image onto a trusted repository where the trusted repository offers a service for dynamic container builds that includes security credentials using a PKI infrastructure.

The trusted dynamic container build service of the registry is engaged upon a container image pull request initiated by the untrusted hosting environment. In response to the sending of the image pull request, the trusted dynamic repository build service initiates a connection to the PKI where a one-time token is generated for a public certificate request. This token is dynamically built into the image and a new authentication hash is generated for the image. The dynamically built image file is linked as the latest tagged image of the container. The registry then responds to the hosting environment with the image along with the new image hash. The hosting environment can now authenticate the signed image and initiate the container image execution.

The hosting environment will identify a location where the container can execute. There is no need to supply keys through services such as through a managed secrets paradigm.

The container application will initiate an enterprise call-home process to obtain authorization. First, the container instance initiates a key retrieval request using the one-time token to obtain a public key. The PKI will supply the public key only to this instance of the image as it is the only instance with this token. Any subsequent instance of the same image would receive a unique one-time token as well and have a public key associated with that instance. The container application will use the public key retrieved from the PKI to create a hash value. The hash value is then transmitted to the enterprise container controller system with the container's public key where a similar process is executed using the enterprise private key and the container's public key. The hash result generated by the enterprise controller is compared to the hash result generated by the container. When these two hashes match, the controller knows that the container calling home is indeed the container that was intended to be initialized. Any container initialized that does not generate a matching hash is destroyed as an unauthorized instance. Note that the enterprise controller may use a variety of authorization policies to authorize container instances including time-of-day, number of simultaneous instances, frequency of instance instantiation, and others, as will be descried herein.

The communication dialog above assumes that the container has direct communications with the PKI and enterprise controller. There may be cases where direct communication connectivity is prevented until the container receives authorization. An enhancement to the methods above is to engage the hosting environment, where a given host serves as a proxy service for the container attempting to initialize. The hosting environment must participate in the call-home process; therefore, the host serves as a proxy. In doing so, the host proxy can monitor the authorization process. When the controller authorizes the container to continue execution, the host proxy can open communication paths for that instance of the container that would have been blocked otherwise.

The trust model has not changed, as shared keys have not been exchanged with the with the hosting environment; however, the hosting environment offers another layer of security by specifically granting additional communication privileges upon container authorization by the enterprise controller.

Once a determination is made that the container is an authorized instance, the secure communications can be initialized using existing security methods such as RSA keys or certificates.

The present system provides for the authorization of each new instance of a container before establishing a secure connection to the container. The authorization prevents the creation of rogue instances of the containers where the usual managed secrets are passed to the container and used to establish secure connectivity. However, the authorization techniques of this disclosure do not preclude the use of managed secrets when secure communications are established using keys provided by or obtained from the infrastructure. The two methods are complementary.

In an embodiment, a method comprises sending a pull request to a registry for a container image; in response to sending the pull request, receiving, a copy of the container image, wherein the copy of the container image has been injected with a one-time use token; initializing the copy of the container image; sending a request to a public key infrastructure (PKI) for a public key based at least in part on the one-time use token; in response to sending the request to the PKI, receiving the public key; generating a hash value signed by the pubic key; sending a request to authorize execution of the copy of the container image to a controller, wherein the request comprises the hash value; in response to sending the request to authorize execution of the copy of the container image, receiving an authorization result from the controller, wherein the authorization result is determined, by the controller, based at least in part on an evaluation of the hash value and one or more authorization policies; based at least in part on the received authorization result, determining whether to execute or terminate the copy of the container image, wherein the method is performed using one or more computing devices.

Other aspects, features and embodiments will become apparent from the appended claims. The appended claims are considered a part of the disclosure.

2.0 Example Computer System Implementation

Figure 1:
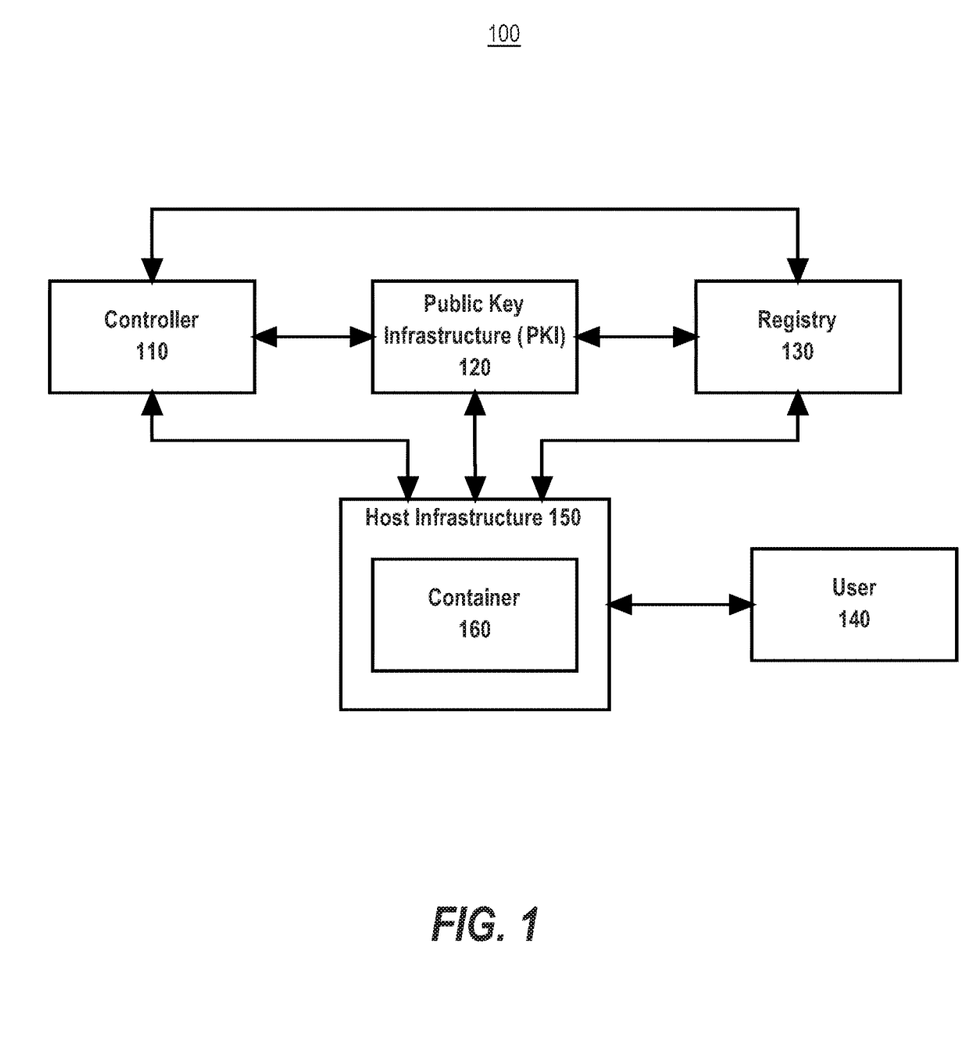
FIG. 1 illustrates an example of a container deployment system, according to one embodiment.

FIG. 1 illustrates an example container deployment system in which the techniques described herein may be practiced, according to some embodiments.

In an embodiment, a container deployment system 100 is programmed or configured to provide secure and efficient initialization and deployment of containers in a host infrastructure. System 100 may be an integral part of a Continuous Integration/Continuous Deployment (CI/CD) system. Container deployment system 100 may be implemented across one or more physical or virtual computing devices, none of which is intended as a generic computer, since it is loaded with instructions in a new ordered combination as otherwise disclosed herein to implement the functions and algorithms of this disclosure. The example components of container deployment system 100 in FIG. 1 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. The functions described herein are intended to indicate operations that are performed using programming in a special-purpose computer or general-purpose computer, in various embodiments. Container deployment system 100 illustrates only one of many possible arrangements of components configured to execute the programming described herein. Other arrangements may include fewer or different components, and the division of work between the components may vary depending on the arrangement.

Container deployment system 100 may include controller 110. Controller 110 is programmed and configured to perform policy authorization on incoming requests to execute a container 160 on host infrastructure 150. Controller 110 may include one or more pre-defined container authorization policies that define one or more business rules for the authorization of incoming requests to execute a container 160. In an embodiment, controller 110 is programmed or configured to perform certificate enrollment with public key infrastructure (PKI) 120 and publish container images to registry 130. Controller 110 may be communicatively coupled to PKI 120, registry 130, and/or host infrastructure 150. In an embodiment, controller 110 may be under the direction or control of system 100 which is attempting to initialize and/or execute container 160 on host infrastructure 150.

PKI 120 is programmed and configured to use a set of hardware, software, policies, roles, procedures, and/or standards to manage the creation, administration, distribution, and revocation of keys and digital certificates. In various embodiments, PKI 120 may include a certificate authority (CA) that is programmed or configured to store, issue, and sign digital certificates, a registration authority that is programmed or configured to verify the identity of entities requesting their digital certificates to be stored at the CA, a central directory that is a programmed or configured to securely store and/or index keys, a certificate management system that is programmed or configured to manage access to the stored certificates or the delivery of the certificates to be issued, and/or one or more certificate policies that are programmed or configured to state the PKI's requirements concerning its procedures and trustworthiness. PKI 120 is communicatively coupled to controller 110, registry 130, and/or host infrastructure 150.

Registry 130, also known as a trusted repository, programmed or configured to store container images and provide container images in response to requests for a container image. In some embodiments, registry 130 is programmed or configured to sign container images and tag container images. Registry 130 may be communicatively coupled to controller 110, PKI 120, and/or host infrastructure 150. Registry 130 may be established under the control of the same entity that establishes or manages other elements of the system and may comprise a private repository that is created within a public repository service such as GITHUB, BITBUCKET or others.

Host infrastructure 150 is a set of one or more computing resources, computing devices, servers, rack servers, and/or other cloud computing infrastructure that can be programmed or configured to execute a container 160. For example, host infrastructure 150 may include the underlying computing resources provided by a cloud computing service. Host infrastructure 150 may be communicatively coupled to controller 110, PKI 120, registry 130, and/or user 140. In some embodiments, host infrastructure 150 may include one or more proxy services to serve as an intermediary for communications between container 160 and controller 110 and/or PKI 120.

User 140 is a user account, username, user login, or other user identifier that may be used to attempt to initialize and execute a container 160 in container deployment system 100.

2.1 Authorization Policies

An authorization policy or container authorization policy defines one or more business rules for the authorization of incoming requests to execute a container 160. Authorization policies may be stored and/or defined at controller 110 to control and manage when and how containers should be executed. The business rules that make up an authorization policy may include any combination of one or more tests for whether or not to allow a container to execute. In an embodiment, the authorization policies for a particular container may be defined by the producer of the container image, who would have the most knowledge of the business purpose and/or limits of the container. The result of the application of at least one of the authorization policies is an authorization result that indicates whether the container may proceed with execution or whether the container must be rejected and terminate execution.

One embodiment of an authorization policy may be used to determine an authorization result based on whether the number of containers of a particular container type would exceed a threshold value. This authorization policy can be configured to limit to the number of instances of a container that may be executed either in a particular time period or concurrently. For example, an authorization policy may indicate that only three instances of a FooBarServer web server may be executing concurrently at any given time. When a new container image for a FooBarServer is initialized, the authorization policy may be used to determine that the initializing instance exceeds the allowable count of concurrently executing instances of this particular container image, and therefore a new instance of the FooBarServer instance should be rejected if user attempts to execute it. By limiting the number of instances of a particular container that are executing, the authorization policy allows for granular control of the deployment of containers according to specific business needs as articulated by the policy.

In another embodiment, an authorization policy may be used to determine an authorization result based on whether a request to execute a container image would violate a time constraint for execution of the container image. For example, an authorization policy may implement a limit that indicates that container images may only execute during certain periods of time or time of day.

Computing resources in a cloud computing service may have variable costs at different times of day. Therefore, it may be preferred that certain types of container images are only executed at particular times. For example, a FooBarServer container image may perform a resource-intensive batch process. Therefore, an authorization policy may indicate that the FooBarServer may only be run during nighttime when such cloud computing costs are more affordable. If a user attempts to execute the FooBarServer container image during daytime hours in violation of the time constraint of the authorization policy, controller 110 may use the authorization policy to determine that such a container image execution should be rejected.

In another embodiment, an authorization policy may be used to determine an authorization result based on whether execution of the container image may incur a cost that exceeds a specified value. For example, an authorization policy may consider the cost of execution of a container image on a particular host 150. For example, a plurality of hosts 150 may exist and may be provided by different cloud computing service providers. The cost of deployment on each of the plurality of hosts 150 may differ, based on different pricing agreements between the enterprise and the particular service provider of a given host 150. If a user attempts to execute a container image on a host 150 that does not comply with the pricing needs of the business rule, the controller 110 may reject the execution of the container image based on the authorization policy.

In another embodiment, an authorization policy may be used to determine an authorization result based on whether execution of the container image would violate a location constraint for execution of the container image. For example, an authorization policy may be an authorization policy that relates to the location of a host 150 that is hosting a container 160. For example, some container images should only be run in particular geographic locations due to local regulations, local customizations of the container image, or other criteria. If a user attempts to execute a container 160 on a host 150 in a location that does not comply with the authorization policy, the controller 110 may reject the execution of such a container.

The above-described authorization policies are merely examples, and in other embodiments, different authorization policies may be implemented that reflect business rules, constraints, restrictions, or other criteria for determining whether to permit a container image to execute or not.

Figure 2A:
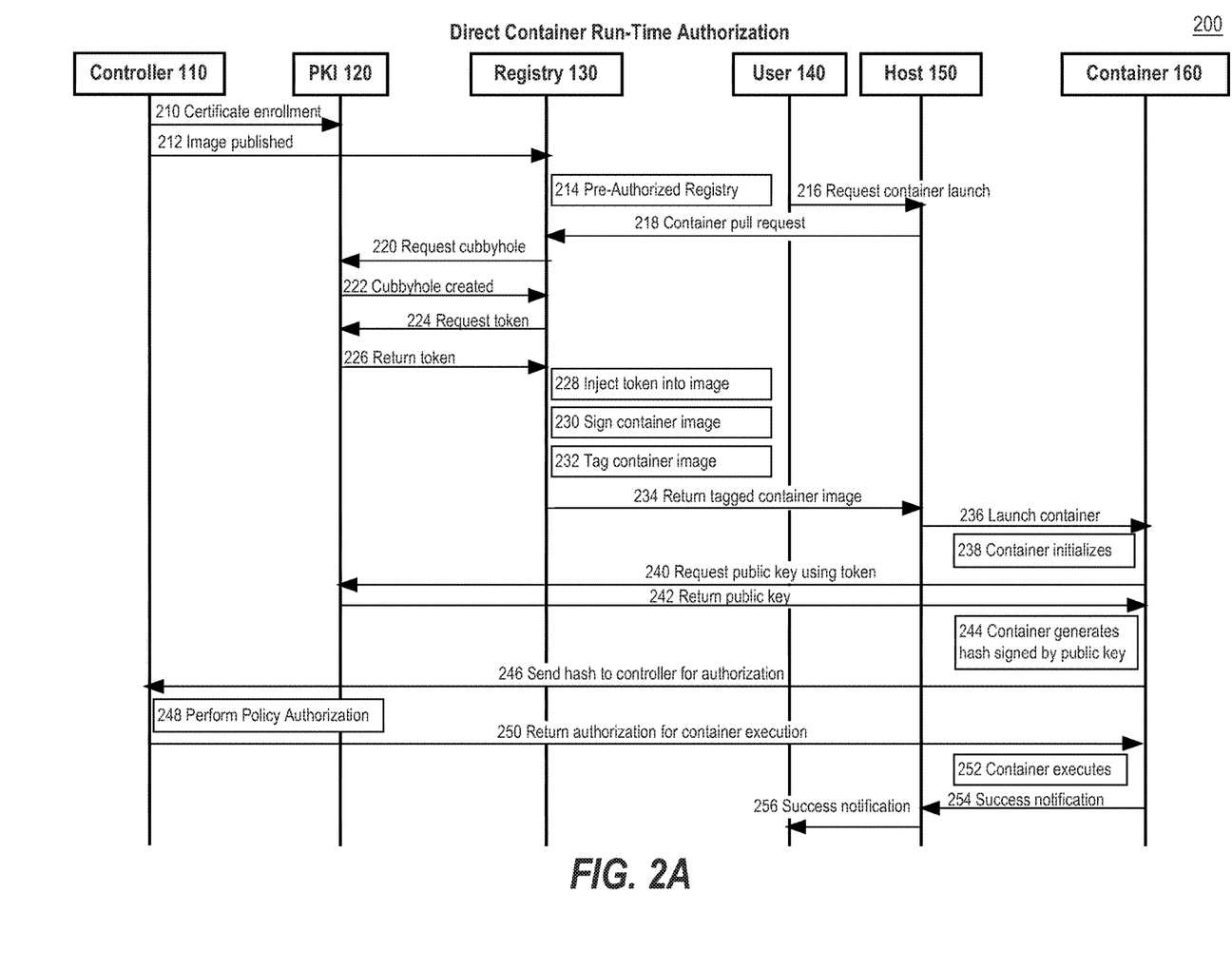
FIG. 2A and FIG. 2B illustrate example flow diagrams of processes for direct container run-time authorization.
Figure 2B:
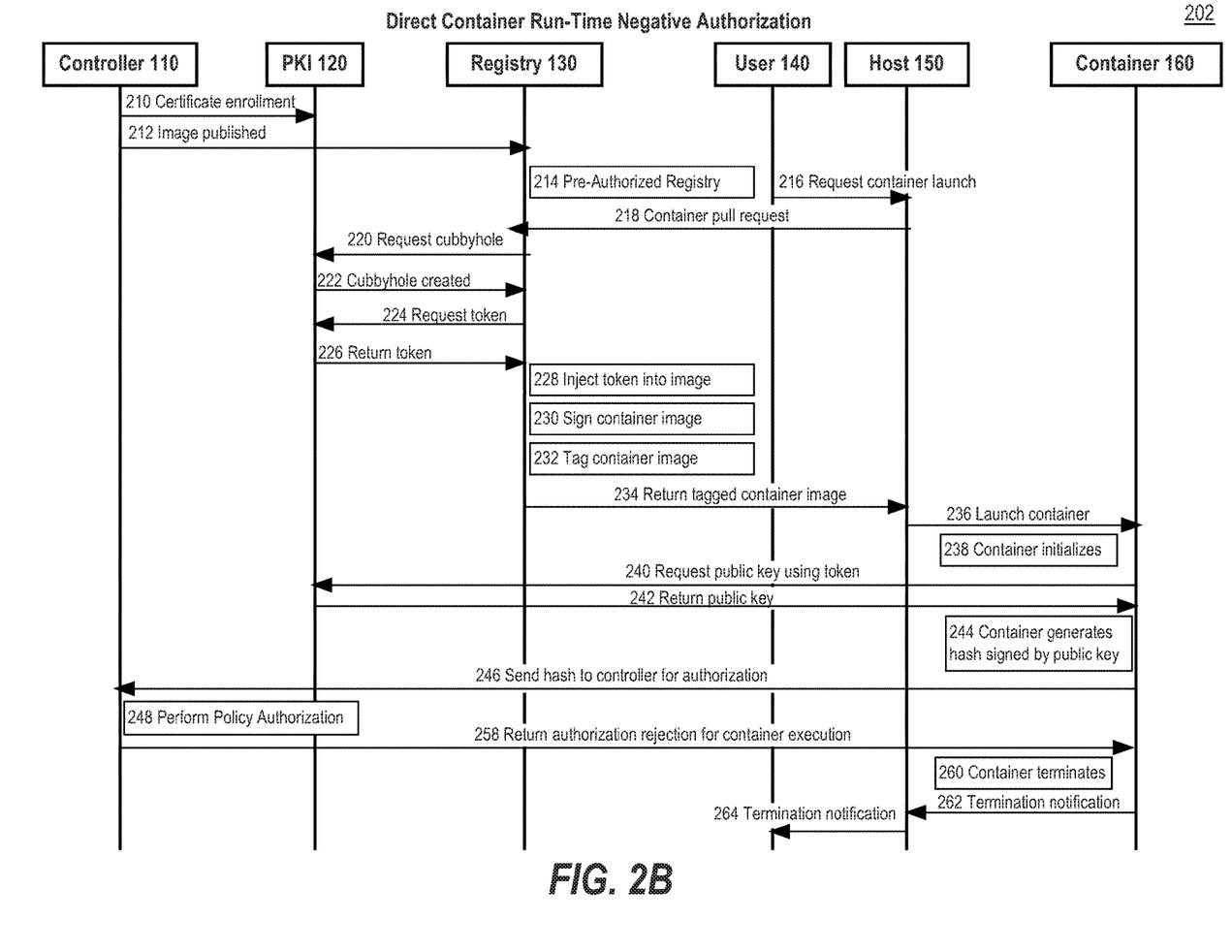

3.0 Example Processes and Algorithms 3.1 Direct Container Run-Time Authorization FIG. 2A and FIG. 2B illustrate flow diagrams of example processes 200 and 202 for performing direct container run-time authorization using a container deployment system 100, according to one embodiment. FIG. 2A and FIG. 2B are intended to disclose algorithms or functional descriptions that may be used as a basis of writing computer programs to implement the functions that are described herein, and which cause a computer to operate in the new manner that is disclosed herein. Further, FIG. 2A and FIG. 2B are provided to communicate such an algorithm at the same level of detail that is normally used, by persons of skill in the art to which this disclosure is directed, to communicate among themselves about plans, designs, specifications and algorithms for other computer programs of a similar level of complexity. The steps of processes 200 and 202 may be performed in any order, and are not limited to the order shown in FIG. 2A and FIG. 2B.

Referring first to FIG. 2A, in an embodiment, a computational process 200 may start in step 210. In step 210, controller 110 is programmed or configured to perform a certificate enrollment with PKI 120. The exact steps of performing certificate enrollment may vary from embodiment to embodiment. The result of certificate enrollment is that controller 110 will have access to a signed digital certificate from PKI 120. For example, in one embodiment, controller 110 may request enrollment from the PKI 120. The request may include a public key and identity information for the controller 110. In response to the request, the PKI 120 may be programmed or configured to encrypt the received request details with its own private key and generate a digital certificate. The resulting certificate may be returned to controller 110, which has now been enrolled. The digital certificate received by controller 110 will include a public key that can be used to verify future communications. The process 200 may then proceed to step 212.

In step 212, controller 110 is programmed or configured to use the certificate received in step 210 to publish a container image to registry 130. Registry 130 is a trusted repository and now has a copy of the latest container image for the given container. For purposes of illustration, let us assume, in one example, that the container image published from controller 110 in this step is an image for particular version of a web server: "FooBarServer v1.1". The process 200 may then proceed to step 214.

In step 214, registry 130 is programmed or configured to preform pre-authorization of the container image published in step 212. Pre-authorization means that the registry 130 stores a copy of the container image in a pre-authorized area that is accessible to host 150. For example, a copy of the FooBarServer v1.1 may be stored in the pre-authorized registry of registry 130. Host 150 may request container images from the pre-authorized registry of registry 130, as those container images have been preliminary authorized for launch on host 150. The process 200 may then proceed to step 216.

In this arrangement, controller 110 is placing the image on the repository using a representation of the image foobar-1.0. The repository builds a representation of the image as foobar-latest that points to foobar-1.0. The repository is programmed to determine that it cannot simply respond to a request from host 150 for foobar-latest with that specific image. The repository has represented the image in its pre-authorized state. When the request comes in for foobar-latest from host 150, the repository is programmed to determine that it shall build a new foobar-latest pointing to foobar-1.1 that includes the unique token. It is this new image that the foobar-latest will point to for the specific image request. At that point, foobar-latest represents a pre-authorized instance of the image foobar-1.1. The next request from host 150 for foobar-latest will cause the registry 130 to generate a new instance of the image as foobar-1.2 where foobar-latest is updated and references this unique instance with a unique OTP. Thus, the registry is programmed to respond only one time for any given image. We keep track of the instances of images from a historical perspective (foobar-1.x) to correlate with image pull requests initiated by the user and executed by host 130.

In step 216, user 140 is programmed or configured to send a container launch request to host 150. The container launch request may include an identifier that indicates that the user 140 is attempting to launch a requested container on host 150. The request is programmed or configured to cause host 150 to pull the latest container image for the requested container. For example, the request of step 216 may include an identifier that identifies the FooBarServer as the container image that is intended to be launched. In an embodiment, the identifier included in the request may not refer to a specific version number of a container image, as the latest version of the container image is what will be used. The process 200 may then proceed to step 218.

In step 218, host 150 is programmed or configured to send a container pull request to registry 130. The container pull request may include an identifier for the requested container and will cause the latest tagged version of the container to be retrieved from registry 130. For example, the container pull request of step 218 may include the same identifier described in step 216 that refers to the FooBarServer. The process 200 may then proceed to step 220.

In step 220, registry 130 is programmed or configured to send a cubbyhole request to PKI 120 that it can use for the incoming container pull request of step 218. A cubbyhole request is a request to generate a one-time use token. The process 200 may then proceed to step 222.

In step 222, PKI 120 is programmed or configured to generate a cubbyhole for a one-time use token and send a response to registry 130 to notify registry 130 that the requested cubbyhole has been created. The process 200 may then proceed to step 224.

In step 224, registry 130 is programmed or configured to request a one-time use token from the previously generated cubbyhole. The process 200 may then proceed to step 226

In step 226, PKI 120 is programmed or configured to provide a one-time use token to registry 130 as taken from the previously generated cubbyhole. The one-time use token may be programmed or configured differently in different embodiments. For example, in some embodiments, the one-time use token may have a limited lifespan of validity, such as 60 seconds, 60 minutes, or some other time period. By providing expiration or limits to the one-time use token, the system is able to improve security and prevent malicious actors from attempting to steal or reuse tokens. The process 200 may then proceed to step 228.

In step 228, registry 130 is programmed or configured to retrieve the latest container image from the pre-authorized registry. For example, the container image for FooBarServer v1.1 will be retrieved and a copy is made. Registry 130 is then further programmed or configured to inject the token received in step 226 into the copy of the container image for FooBarServer v1.1. This copy of the container image can now be referred to as FooBarServer v1.1.1, as it is a sub-instance of the existing container image FooBarServer v1.1.

While the contents of the container images for FooBarServer v1.1 and FooBarServer v1.1.1 are generally the same, however, the new copy FooBarServer v1.1.1 has a one-time use token injected into it to allow it to be uniquely identified from the generic FooBarServer v1.1. Thus, by injecting the token into a container image, the present system is able to distinguish the particular instance of the container image from other instances of the container image. The ability to distinguish the particular instance of the container image will allow the present system to accurately track and verify appropriate deployment and execution of container images, using at least one of the authorization policies defined at controller 110. The process 200 may then proceed to step 230.

In step 230, registry 130 is programmed or configured to sign the copy of the container image that was generated in step 228. By using the registry 130 to sign the copy of the container image, consumers of the container image, such as host 150 can verify that the container image that they receive is trustworthy and secure, and is not a malicious copy of a container image, such as would be used in a man-in-the-middle attack. The process 200 may then proceed to step 232.

In step 232, registry 130 is programmed or configured to tag the copy of the container image generated in step 228 as the "latest" container image. For example, FooBarServer v1.1.1 is tagged as the "latest" container image of the FooBarServer container image. The latest tagged container image is the one that will be used for responding to the container pull request sent in step 218. The process 200 may then proceed to step 234.

In step 234, registry 130 is programmed or configured to return the latest container image for the requested container to the host 150. This latest container image will be the uniquely identified container image that had a token injected to it and was subsequently signed and tagged in steps 228, 230, and 232. The process 200 may then proceed to step 236.

In step 236, host 150 is programmed or configured to launch container 160 on its own infrastructure. Container 160 is the container image returned in step 234. In an embodiment host 150 may allocate memory and computing resources for container 160. The process 200 may then proceed to step 238.

In step 238, container 160 is programmed or configured to begin initialization in response to the launch command issued in step 236. Initialization of the container 160 means that memory and computing resources are allocated to the instantiation of container 160, however, the container 160 is not yet authorized to fully execute and/or perform its internal functions. The process 200 may then proceed to step 240.

In step 240, container 160 is programmed or configured to retrieve the token that was injected into its container image. Container 160 is further programmed or configured to send a request to PKI 120 for the public key associated with the token. The process 200 may then proceed to step 242.

In step 242, PKI 120 is programmed or configured to return the public key associated with the token. The process 200 may then proceed to step 244.

In step 244, container 160 is programmed or configured to generate a hash value signed using the public key returned in step 242. The signed hash value will be unique for the given container 160, thereby allowing another entity, such as controller 110 to distinguish the hash value generated by container 160 from hash values generated by other instances of the same container image or hash values generated by a malicious actor. Moreover, since the hash value is signed by the public key, the authenticity of the container 160 as a trusted provider of the hash value is maintained. The process 200 may then proceed to step 246.

Typically a container is an application and an execution environment is established prior to the application executing. For example, an application that attaches to external network resources needs to establish IP connectivity, so network interfaces or sockets must be initialized prior to the application executing. In a similar manner, the enterprise will encode an initialization process into the container image that executes before the application executes. Therefore, in an embodiment, the hashing validation process occurs after network initialization so the container can communicate with the controller 110 or the host 150 acting as a proxy. Once the application bootstrap process completes (for example, interfaces are established and there is positive acknowledgement from the controller), the application can actually interact with other applications.

In step 246, container 160 is programmed or configured to send the hash value generated in step 244 to the controller 110 for verification and authorization. The process 200 may then proceed to step 248.

In step 248, controller 110 is programmed or configured to apply one or more authorization policies to the hash value sent in step 246 in order to determine whether the container 160 should be authorized to execute or not. The hash result generated by the controller 110 is compared to the hash result generated by the container 160. When these two hashes match, the controller knows that the container 160 is indeed the container that was intended to be initialized. Authorization policies may be any pre-defined policy for container execution, and may include rules on the number of allowance instances of a container, rules relating to time of day, rule relating to the lifetime attributes of container instances, rules relating to the cost model of execution on host 150, or any other business rules that may be specified to manage or limit whether container instances of a particular container image that may execute or not.

Since the hash value received contains uniquely identifying information that distinguishes this particular container 160 from other instances of the same container images, due to the token injected into the container image for container 160, the authorization policies can be implemented to particular details of particular instances of container images that would not be possible if a token was not injected into the container image. In this particular example of process 200, the container 160 is determined to be authorized to continue execution. The process 200 may then proceed to step 250.

In step 250, controller 110 is programmed or configured to return an authorization for container execution to container 160. The authorization may be a message that indicates that the container 160 may continue with execution. The process 200 may then proceed to step 252.

In step 252, in response to receiving the authorization in step 250, container 160 is programmed or configured to commence execution. The process 200 may then proceed to step 254.

In step 254, container 160 is programmed or configured to send a success notification to host 150 that indicates that container 160 has successfully completed execution. The process 200 may then proceed to step 256.

In step 256, host 150 is programmed or configured to send a success notification to user 140 that indicates that container 160 has successfully completed execution. The process 200 may then end.

FIG. 2B illustrates a process 202 for direct container run-time negative authorization. Steps 210 through 248 are analogous to the same steps described above with reference to FIG. 2A. However, in step 248 of FIG. 2B, the result of the policy authorization is that controller 110 determines, based on at least one of the authorization policies and the hash sent in step 246, that container 160 is not authorized to continue forward with execution.

Thus, in step 258, controller 110 is programmed or configured to return an authorization rejection for container execution to container 160. The authorization rejection may be a message that indicates that the container 160 may not continue with execution. In one embodiment, the authorization rejection may include information that describes why the rejection occurred, such as an indication as to which authorization policy was failed. The process 202 may then proceed to step 260.

In step 260, in response to receiving the authorization rejection in step 258, container 160 is programmed or configured to terminate itself. Thus, by failing the policy authorization in step 248, the container 160 halts further operations and does not proceed to execution. The process 202 may then proceed to step 25462.

In step 262, container 160 is programmed or configured to send a termination notification to host 150 that indicates that container 160 has terminated. In one embodiment, the termination notification may contain information that describes the authorization policy that was failed, thereby indicating why the container did not successfully execute. The process 202 may then proceed to step 264.

In step 264, host 150 is programmed or configured to send a termination notification to user 140 that indicates that container 160 has terminated execution. In one embodiment, the termination notification may contain information that describes the authorization policy that was failed, thereby indicating why the container did not successfully execute. The process 202 may then end.

3.2 Proxy Container Run-Time Authorization

While FIGS. 2A and 2B describe processes for direct container authorization, those implementations require the container deployment system 100 to allow direct communication from container 160 to controller 110 and/or to PKI 120, and back. In some embodiments, it may be beneficial to prevent container 160 from communicating directly with controller 110 and/or PKI 120, in order to ensure that message communication with controller 110 and/or PKI 120 is trusted. In these cases, host 150 may include a proxy service to serve as an intermediary for communications from container 160 with controller 110 and/or PKI 120.

Figure 3A:
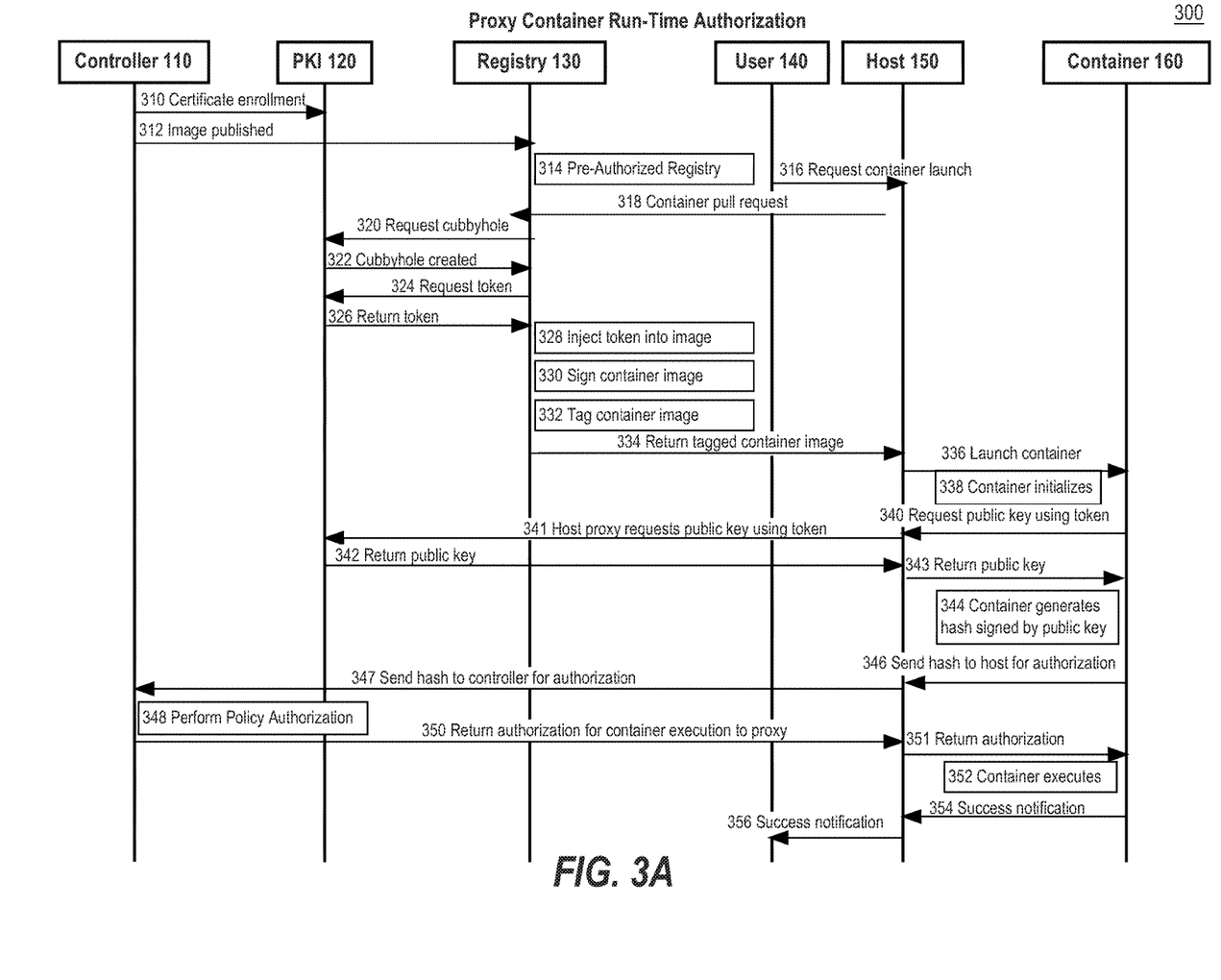
FIG. 3A and FIG. 3B illustrate example flow diagrams of processes for proxy-based container run-time authorization.
Figure 3B:
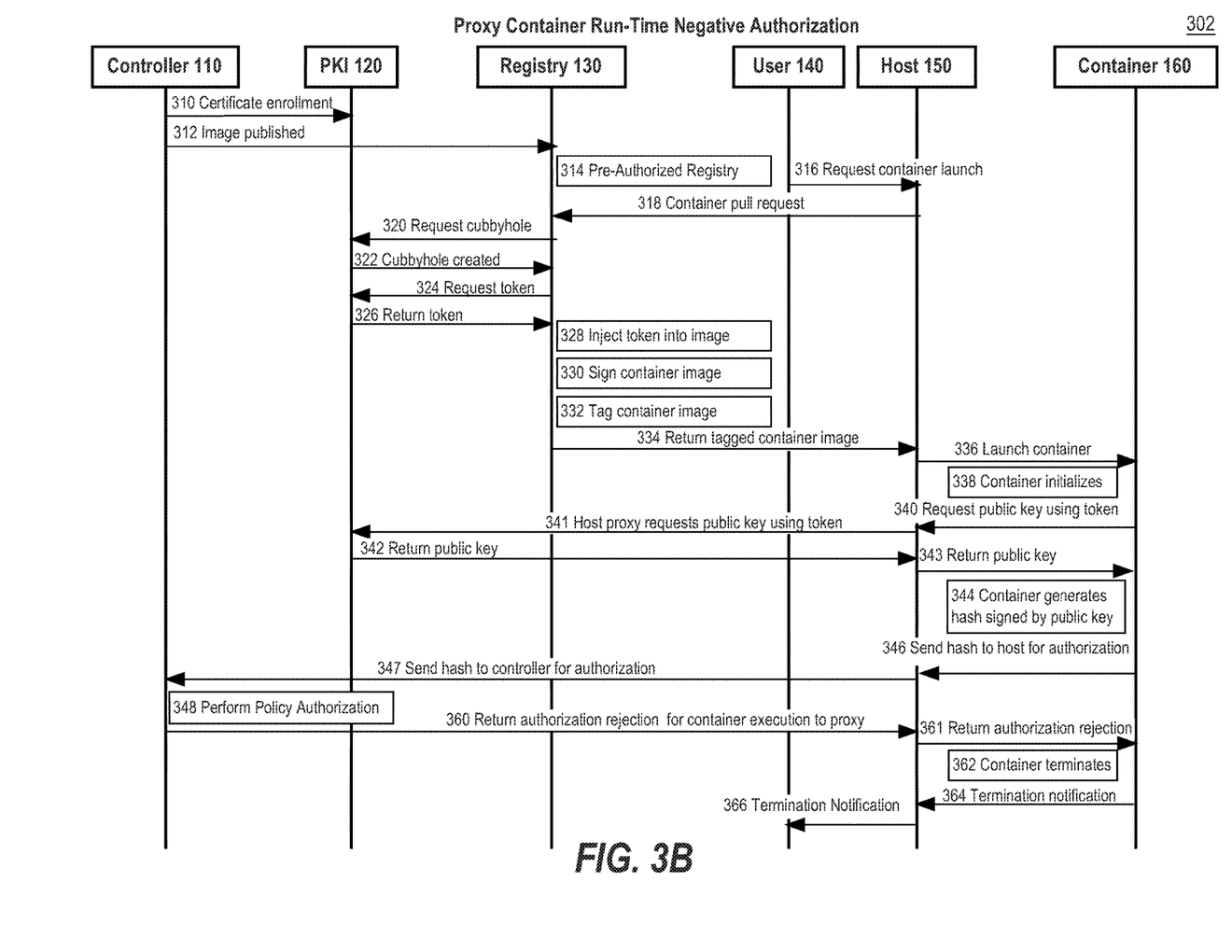

FIG. 3A and FIG. 3B illustrate flow diagrams of example processes 300 and 302 for performing proxy container run-time authorization using a container deployment system 100, according to one embodiment. FIG. 3A and FIG. 3B are intended to disclose algorithms or functional descriptions that may be used as a basis of writing computer programs to implement the functions that are described herein, and which cause a computer to operate in the new manner that is disclosed herein. Further, FIG. 3A and FIG. 3B are provided to communicate such an algorithm at the same level of detail that is normally used, by persons of skill in the art to which this disclosure is directed, to communicate among themselves about plans, designs, specifications and algorithms for other computer programs of a similar level of complexity. The steps of processes 300 and 302 may be performed in any order, and are not limited to the order shown in FIG. 3A and FIG. 3B.

Referring to process 300 of FIG. 3A, steps 310 through 338 are analogous to steps 210 through 238 described above with reference to FIG. 2A, and those descriptions should be incorporated by reference as if set forth here. After container initialization in step 338, process 300 may then proceed to step 340.

In step 340, container 160 is programmed or configured to retrieve the token that was injected into its container image. Container 160 is further programmed or configured to send a request to host 150 for the public key associated with the token. The process 300 may then proceed to step 341.

In step 341, a proxy service of host 150 is programmed or configured to receive the request sent in step 340, and in response, send a request to PKI 120 for the public key associated with the token. The process 300 may then proceed to step 342.

In step 342, PKI 120 is programmed or configured to return the public key associated with the token to the proxy service of host 150. The process 300 may then proceed to step 343.

In step 343, the proxy service of host 150 is programmed or configured to return the public key received in step 342 to container 160. The process 300 may then proceed to step 344.

In step 344, container 160 is programmed or configured to generate a hash value signed using the public key returned in step 344. A seed value necessary to generate the hash value may be obtained from or exchanged with the controller; the token may be the seed value or, in other embodiments, the container may generate a unique seed value. The signed hash value will be unique for the given container 160, thereby allowing another entity, such as controller 110 to distinguish the hash value generated by container 160 from hash values generated by other instances of the same container image. Moreover, since the hash value is signed by the public key, the authenticity of the container 160 as a trusted provider of the hash value is maintained. The process 300 may then proceed to step 346.

In step 346, container 160 is programmed or configured to send the hash value generated in step 344 to the proxy service of host 150 for verification and authorization. The process 300 may then proceed to step 347.

In step 347, the proxy service of host 150 is programmed or configured to send the hash value received in step 346 to controller 110 for verification and authorization. The process 300 may then proceed to step 348.

In step 348, controller 110 is programmed or configured to apply one or more authorization policies to the hash value sent in step 347 in order to determine whether the container 160 should be authorized to execute or not. The hash result generated by the controller 110 is compared to the hash result generated by the container 160. When these two hashes match, the controller knows that the container 160 is indeed the container that was intended to be initialized. Authorization policies may be any pre-defined policy for container execution, and may include rules on the number of allowance instances of a container, rules relating to time of day, rule relating to the lifetime attributes of container instances, rules relating to the cost model of execution on host 150, or any other business rules that may be specified to manage or limit whether container instances of a particular container image that may execute or not.

Since the hash value received contains uniquely identifying information that distinguishes this particular container 160 from other instances of the same container images, due to the token injected into the container image for container 160, the authorization policies can be implemented to particular details of particular instances of container images that would not be possible if a token was not injected into the container image. In this particular example of process 300, the container 160 is determined to be authorized to continue execution. The process 300 may then proceed to step 350.

In step 350, controller 110 is programmed or configured to return an authorization for container execution to the proxy service of host 150. The authorization may be a message that indicates that the container 160 may continue with execution. The process 300 may then proceed to step 351.

In step 351, the proxy service of host 150 is programmed or configured to return an authorization for container execution to container 160. The authorization may be a message that indicates that the container 160 may continue with execution. The process 300 may then proceed to step 352.

In step 352, in response to receiving the authorization in step 351, container 160 is programmed or configured to commence execution. The process 300 may then proceed to step 354.

In step 354, container 160 is programmed or configured to send a success notification to host 150 that indicates that container 160 has successfully completed execution. The process 300 may then proceed to step 356.

In step 356, host 150 is programmed or configured to send a success notification to user 140 that indicates that container 160 has successfully completed execution. The process 300 may then end.

FIG. 3B illustrates a process 302 for proxy container run-time negative authorization. Steps 310 through 348 are analogous to the same steps described above with reference to FIG. 3A. However, in step 348 of FIG. 3B, the result of the policy authorization is that controller 110 determines, based on at least one of the authorization policies and the hash sent in step 346, that container 160 is not authorized to continue forward with execution.

Thus, in step 360, controller 110 is programmed or configured to return an authorization rejection for container execution to the proxy service of host 150. The authorization rejection may be a message that indicates that the container 160 may not continue with execution. In an embodiment, the authorization rejection message may include information that indicates the cause of the rejection, such as an identification of the policy that failed. The process 302 may then proceed to step 361.

In step 361, the proxy service of host 150 is programmed or configured to return an authorization rejection for container execution to container 160. The authorization rejection may be a message that indicates that the container 160 may not continue with execution. The process 302 may then proceed to step 362.

In step 352, in response to receiving the authorization rejection in step 361, container 160 is programmed or configured to terminate. The process 302 may then proceed to step 364.

In step 354, container 160 is programmed or configured to send a termination notification to host 150 that indicates that container 160 has terminated. In one embodiment, the termination notification may contain information that describes the authorization policy that was failed, thereby indicating why the container did not successfully execute. The process 302 may then proceed to step 366.

In step 366, host 150 is programmed or configured to send a termination notification to user 140 that indicates that container 160 has terminated execution. In one embodiment, the termination notification may contain information that describes the authorization policy that was failed, thereby indicating why the container did not successfully execute. The process 302 may then end.

4.0 Implementation Mechanisms—Hardware Overview

Figure 4:
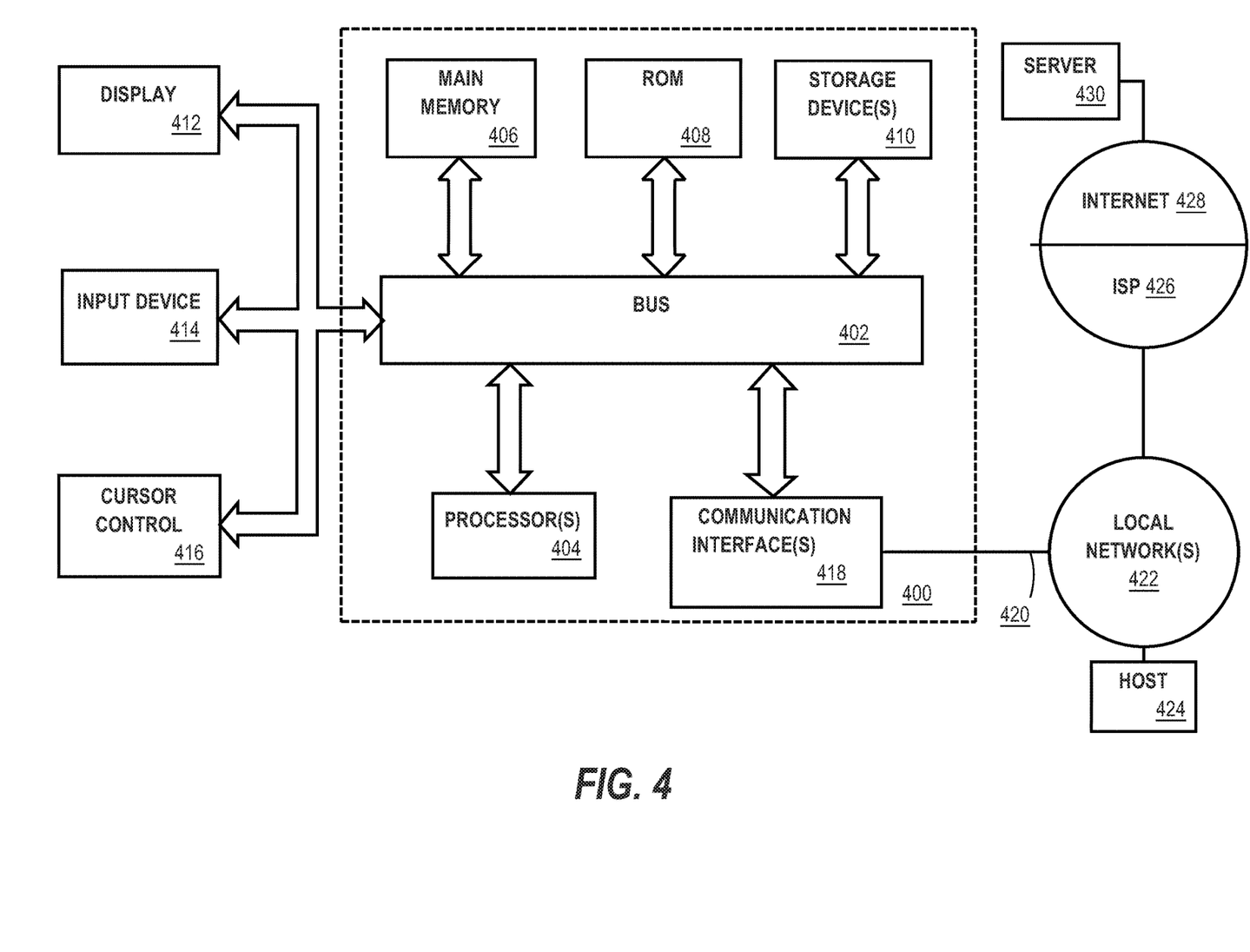
FIG. 4 is a block diagram of a computing device in which the example embodiment(s) of the present invention may be embodied.

Referring now to FIG. 4, it is a block diagram that illustrates a computing device 400 in which the example embodiment(s) of the present invention may be embodied. Computing device 400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 400 may include a bus 402 or other communication mechanism for addressing main memory 406 and for transferring data between and among the various components of device 400.

Computing device 400 may also include one or more hardware processors 404 coupled with bus 402 for processing information. A hardware processor 404 may be a general-purpose microprocessor, a system on a chip (SoC), or other processor.

Main memory 406, such as a random-access memory (RAM) or other dynamic storage device, also may be coupled to bus 402 for storing information and software instructions to be executed by processor(s) 404. Main memory 406 also may be used for storing temporary variables or other intermediate information during execution of software instructions to be executed by processor(s) 404.

Software instructions, when stored in storage media accessible to processor(s) 404, render computing device 400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 400 also may include read only memory (ROM) 408 or other static storage device coupled to bus 402 for storing static information and software instructions for processor(s) 404.

One or more mass storage devices 410 may be coupled to bus 402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 410 (e.g., the main hard disk for the device) stores a body of program and data for directing operation of the computing device, including an operating system, user application programs, driver and other support files, as well as other data files of all sorts.

Computing device 400 may be coupled via bus 402 to display 412, such as a liquid crystal display (LCD) or other electronic visual display, for displaying information to a computer user. In some configurations, a touch sensitive surface incorporating touch detection technology (e.g., resistive, capacitive, etc.) may be overlaid on display 412 to form a touch sensitive display for communicating touch gesture (e.g., finger or stylus) input to processor(s) 404.

An input device 414, including alphanumeric and other keys, may be coupled to bus 402 for communicating information and command selections to processor 404. In addition to or instead of alphanumeric and other keys, input device 414 may include one or more physical buttons or switches such as, for example, a power (on/off) button, a "home" button, volume control buttons, or the like.

Another type of user input device may be a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

While in some configurations, such as the configuration depicted in FIG. 4, one or more of display 412, input device 414, and cursor control 416 are external components (i.e., peripheral devices) of computing device 400, some or all of display 412, input device 414, and cursor control 416 are integrated as part of the form factor of computing device 400 in other configurations.

Functions of the disclosed systems, methods, and modules may be performed by computing device 400 in response to processor(s) 404 executing one or more programs of software instructions contained in main memory 406. Such software instructions may be read into main memory 406 from another storage medium, such as storage device(s) 410. Execution of the software instructions contained in main memory 406 cause processor(s) 404 to perform the functions of the example embodiment(s).

While functions and operations of the example embodiment(s) may be implemented entirely with software instructions, hard-wired or programmable circuitry of computing device 400 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more software instructions to processor(s) 404 for execution. For example, the software instructions may initially be carried on a magnetic disk or solid-state drive of a remote computer. The remote computer can load the software instructions into its dynamic memory and send the software instructions over a telephone line using a modem. A modem local to computing device 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor(s) 404 retrieves and executes the software instructions. The software instructions received by main memory 406 may optionally be stored on storage device(s) 410 either before or after execution by processor(s) 404.

Computing device 400 also may include one or more communication interface(s) 418 coupled to bus 402. A communication interface 418 provides a two-way data communication coupling to a wired or wireless network link 420 that is connected to a local network 422 (e.g., Ethernet network, Wireless Local Area Network, cellular phone network, Bluetooth wireless network, or the like). Communication interface 418 sends and receives electrical, electromagnetic, or optical signals that carry digital data streams representing various types of information. For example, communication interface 418 may be a wired network interface card, a wireless network interface card with an integrated radio antenna, or a modem (e.g., ISDN, DSL, or cable modem).

Network link(s) 420 typically provide data communication through one or more networks to other data devices. For example, a network link 420 may provide a connection through a local network 422 to a host computer 424 or to data equipment operated by an Internet Service Provider (ISP) 426. ISP 426 in turn provides data communication services through the world wide packet data communication network now commonly referred to as the "Internet" 428. Local network(s) 422 and Internet 428 use electrical, electromagnetic or optical signals that carry digital data streams. The signals through the various networks and the signals on network link(s) 420 and through communication interface(s) 418, which carry the digital data to and from computing device 400, are example forms of transmission media.

Computing device 400 can send messages and receive data, including program code, through the network(s), network link(s) 420 and communication interface(s) 418. In the Internet example, a server 430 might transmit a requested code for an application program through Internet 428, ISP 426, local network(s) 422 and communication interface(s) 418.

The received code may be executed by processor 404 as it is received, and/or stored in storage device 410, or other non-volatile storage for later execution.

5.0 Implementation Mechanisms—Software Overview

Figure 5:
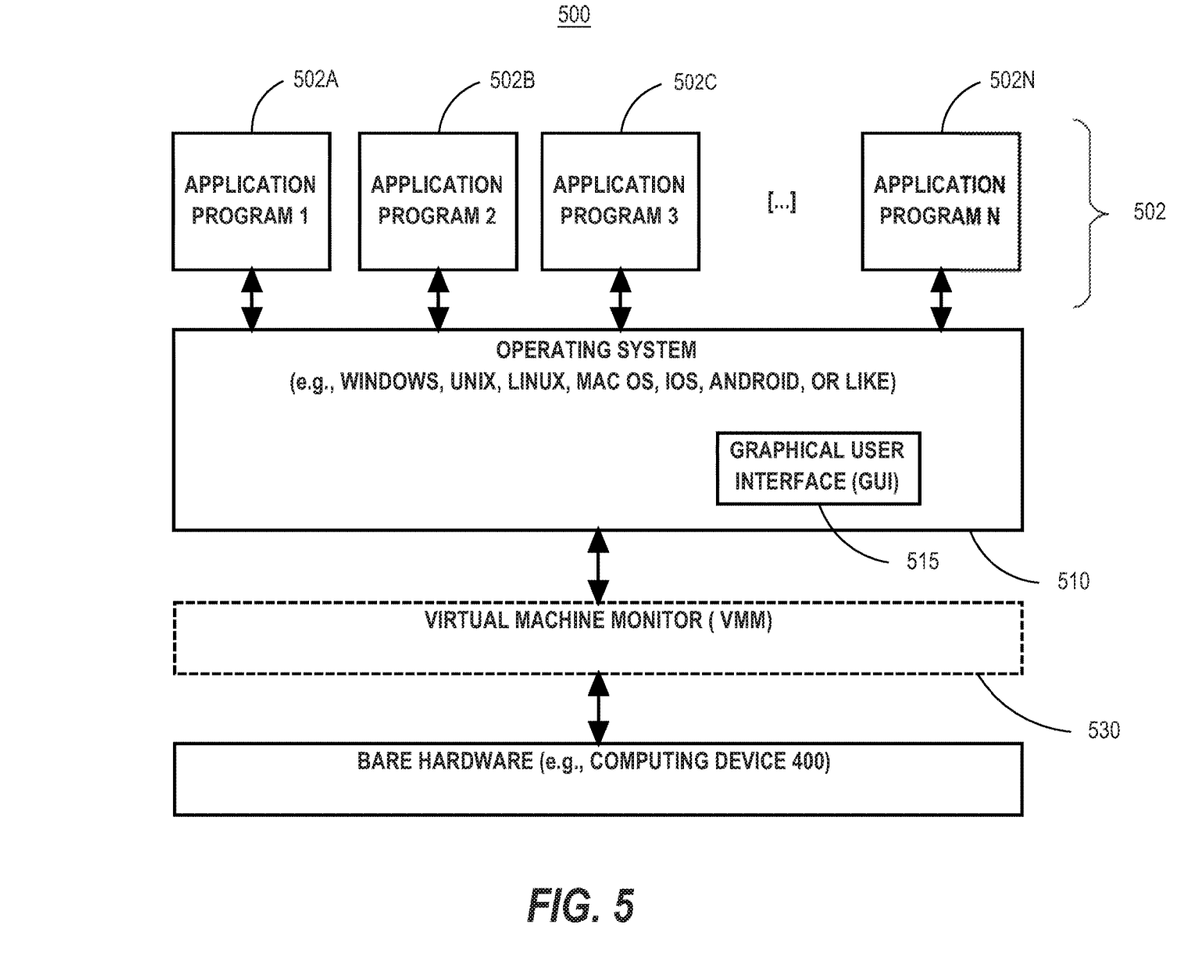
FIG. 5 is a block diagram of a software system for controlling the operation of the computing device.

FIG. 5 is a block diagram of a software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method, comprising:
sending a pull request to a registry for a container image;
in response to sending the pull request, receiving, a copy of the container image, wherein the copy of the container image has been injected with a one-time use token;
initializing the copy of the container image;
sending a request to a public key infrastructure (PKI) for a public key based at least in part on the one-time use token;
in response to sending the request to the PKI, receiving the public key;
generating a hash value signed by the pubic key;
sending a request to authorize execution of the copy of the container image to a controller, wherein the request comprises the hash value;
in response to sending the request to authorize execution of the copy of the container image, receiving an authorization result from the controller, wherein the authorization result is determined, by the controller, based at least in part on an evaluation of the hash value and one or more authorization policies; and based at least in part on the received authorization result, determining whether to execute or terminate the copy of the container image,
wherein the method is performed using one or more computing devices.

2. The method of claim 1, further comprising:
in response to receiving the pull request, sending a request from the registry to the PKI to create a cubbyhole comprising the one-time use token;
receiving a notification, at the registry, from the PKI that the cubbyhole has been created;
sending a request from the registry to the PKI for the one-time use token; and
receiving, at the registry, the one-time use token.

3. The method of claim 2, further comprising injecting, by the registry, the one-time use token into the copy of the container image.

4. The method of claim 2, further comprising signing, by the registry, the copy of the container image.

5. The method of claim 2, further comprising tagging, by the registry, the copy of the container image as the latest version of the container image.

6. The method of claim 1, wherein the one or more authorization policies comprise at least one of:
at least one policy for generating an authorization result based on determining whether the request to authorize execution of the copy of the container image would cause a number of active containers to exceed a threshold number of active containers;
at least one policy for generating an authorization result based on determining whether the request to authorize execution of the copy of the container image would incur a cost that exceeds a specified value;
at least one policy for generating an authorization result based on determining whether the request to authorize execution of the copy of the container image would violate a time constraint for execution of the container image; or
at least one policy for generating an authorization result based on determining whether the request to authorize execution of the copy of the container image would violate a location constraint for execution of the container image.

7. The method of claim 1, further comprising sending a notification to a user based on the authorization result.

8. One or more non-transitory computer-readable media storing instructions, wherein the instructions, when executed by one or more processors, cause one or more computing devices to perform:
sending a pull request to a registry for a container image;
in response to sending the pull request, receiving, a copy of the container image, wherein the copy of the container image has been injected with a one-time use token;
initializing the copy of the container image;
sending a request to a public key infrastructure (PKI) for a public key based at least in part on the one-time use token;
in response to sending the request to the PKI, receiving the public key;
generating a hash value signed by the pubic key;
sending a request to authorize execution of the copy of the container image to a controller, wherein the request comprises the hash value;
in response to sending the request to authorize execution of the copy of the container image, receiving an authorization result from the controller, wherein the authorization result is determined, by the controller, based at least in part on an evaluation of the hash value and one or more authorization policies; and
based at least in part on the received authorization result, determining whether to execute or terminate the copy of the container image.

9. The computer-readable medium of claim 8, further comprising instructions which when executed cause the one or more computing devices to perform:
in response to receiving the pull request, sending a request from the registry to the PKI to create a cubbyhole comprising the one-time use token;
receiving a notification, at the registry, from the PKI that the cubbyhole has been created;
sending a request from the registry to the PKI for the one-time use token; and
receiving, at the registry, the one-time use token.

10. The computer-readable medium of claim 9, further comprising instructions which when executed cause the one or more computing devices to perform injecting, by the registry, the one-time use token into the copy of the container image.

11. The computer-readable medium of claim 9, further comprising instructions which when executed cause the one or more computing devices to perform signing, by the registry, the copy of the container image.

12. The computer-readable medium of claim 9, further comprising instructions which when executed cause the one or more computing devices to perform tagging, by the registry, the copy of the container image as the latest version of the container image.

13. The computer-readable medium of claim 8, wherein the one or more authorization policies comprise at least one of:
at least one policy for generating an authorization result based on determining whether the request to authorize execution of the copy of the container image would cause a number of active containers to exceed a threshold number of active containers;
at least one policy for generating an authorization result based on determining whether the request to authorize execution of the copy of the container image would incur a cost that exceeds a specified value;
at least one policy for generating an authorization result based on determining whether the request to authorize execution of the copy of the container image would violate a time constraint for execution of the container image; or
at least one policy for generating an authorization result based on determining whether the request to authorize execution of the copy of the container image would violate a location constraint for execution of the container image.

14. The computer-readable medium of claim 8, further comprising instructions which when executed cause the one or more computing devices to perform sending a notification to a user based on the authorization result.

15. A computer system comprising:
a controller that is communicatively coupled to a registry;
one or more non-transitory computer-readable media coupled to the controller and storing instructions, wherein the instructions, when executed by one or more processors, cause one or more computing devices to perform:
sending a pull request to the registry for a container image;

in response to sending the pull request, receiving, a copy of the container image, wherein the copy of the container image has been injected with a one-time use token;

initializing the copy of the container image;

sending a request to a public key infrastructure (PKI) for a public key based at least in part on the one-time use token;

in response to sending the request to the PKI, receiving the public key;

generating a hash value signed by the pubic key;

sending a request to authorize execution of the copy of the container image to a controller, wherein the request comprises the hash value;

in response to sending the request to authorize execution of the copy of the container image, receiving an authorization result from the controller, wherein the authorization result is determined, by the controller, based at least in part on an evaluation of the hash value and one or more authorization policies; and based at least in part on the received authorization result, determining whether to execute or terminate the copy of the container image.

16. The computer system of claim 15, the computer-readable medium further comprising instructions which when executed cause the one or more computing devices to perform:

in response to receiving the pull request, sending a request from the registry to the PKI to create a cubbyhole comprising the one-time use token;

receiving a notification, at the registry, from the PKI that the cubbyhole has been created;

sending a request from the registry to the PKI for the one-time use token; and receiving, at the registry, the one-time use token.

17. The computer system of claim 16, the computer-readable medium further comprising instructions which when executed cause the one or more computing devices to perform injecting, by the registry, the one-time use token into the copy of the container image.

18. The computer system of claim 16, the computer-readable medium further comprising instructions which when executed cause the one or more computing devices to perform signing, by the registry, the copy of the container image.

19. The computer system of claim 16, the computer-readable medium further comprising instructions which when executed cause the one or more computing devices to perform tagging, by the registry, the copy of the container image as the latest version of the container image.

20. The computer system of claim 15, wherein the one or more authorization policies comprise at least one of:

at least one policy for generating an authorization result based on determining whether the request to authorize execution of the copy of the container image would cause a number of active containers to exceed a threshold number of active containers;

at least one policy for generating an authorization result based on determining whether the request to authorize execution of the copy of the container image would incur a cost that exceeds a specified value;

at least one policy for generating an authorization result based on determining whether the request to authorize execution of the copy of the container image would violate a time constraint for execution of the container image; or at least one policy for generating an authorization result based on determining whether the request to authorize execution of the copy of the container image would violate a location constraint for execution of the container image.

* * * * *